(12) United States Patent
Sweeney et al.

(10) Patent No.: US 10,339,351 B2
(45) Date of Patent: *Jul. 2, 2019

(54) SYSTEMS AND METHODS FOR DECODING AND USING DATA ON CARDS

(71) Applicant: Integrated Solutions International, Inc., Winston-Salem, NC (US)

(72) Inventors: Michael F. Sweeney, Winston-Salem, NC (US); Thomas J. Stopyra, Winston-Salem, NC (US); Kenneth F. Gooden, Winston-Salem, NC (US)

(73) Assignee: Integrated Solutions International, Inc., Winston-Salem, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/954,909

(22) Filed: Apr. 17, 2018

(65) Prior Publication Data

US 2018/0232551 A1 Aug. 16, 2018

Related U.S. Application Data

(63) Continuation of application No. 15/382,319, filed on Dec. 16, 2016, now Pat. No. 9,984,266, which is a
(Continued)

(51) Int. Cl.
*G06K 5/00* (2006.01)
*G06K 7/10* (2006.01)
(Continued)

(52) U.S. Cl.
CPC ....... *G06K 7/10821* (2013.01); *G06K 7/1404* (2013.01); *G06K 7/1408* (2013.01); *G06K 7/1417* (2013.01); *G06K 19/06037* (2013.01)

(58) Field of Classification Search
CPC ...... G06Q 10/087; G06Q 30/06; G06Q 10/08; G06Q 10/083; G06Q 20/027; G06Q 20/06;
(Continued)

(56) References Cited

U.S. PATENT DOCUMENTS

| 8,392,975 B1 | 3/2013 | Raghunath |
| 8,485,440 B1 | 7/2013 | Arora et al. |

(Continued)

FOREIGN PATENT DOCUMENTS

| DE | 103 34 012 | 2/2005 |
| EP | 1 811 472 | 7/2007 |

(Continued)

OTHER PUBLICATIONS

Patent Cooperation Treaty, International Search Report and Written Opinion, International Application No. PCT/US2014/055916, dated Dec. 3, 2014.

(Continued)

*Primary Examiner* — Thien M Le
(74) *Attorney, Agent, or Firm* — Kilpatrick Townsend & Stockton LLP

(57) ABSTRACT

Systems and methods for decoding and using data on cards are disclosed. According to one disclosed embodiment, a system for decoding and using data on cards includes: a network interface; a scanner configured to scan a passive data source on the identification card and transmit a scanner signal associated with the passive data source; a processor coupled to the scanner and the network interface, the processor configured to: receive the scanner signal; process the scanner signal and determine data stored in the passive data source.

20 Claims, 4 Drawing Sheets

Related U.S. Application Data continuation of application No. 14/487,952, filed on Sep. 16, 2014, now Pat. No. 9,558,387.

(60) Provisional application No. 61/878,823, filed on Sep. 17, 2013.

(51) Int. Cl.
  *G06K 7/14* (2006.01)
  *G06K 19/06* (2006.01)

(58) Field of Classification Search
  CPC .. G06Q 20/204; G06Q 20/30; G06Q 20/3227; G06Q 20/34; G06Q 20/36; G06Q 20/3829; G06Q 20/385; G06Q 20/40; G06Q 20/401; G06Q 30/00; G06Q 30/0241; G06Q 30/0635; G06Q 50/10; G06F 13/00; G06F 17/30879; G07C 9/00047
  See application file for complete search history.

(56) References Cited

U.S. PATENT DOCUMENTS

| | | | |
|---|---|---|---|
| 8,967,460 B1 | 3/2015 | Baykal et al. | |
| 9,558,387 B2 | 1/2017 | Sweeney et al. | |
| 9,984,266 B2 * | 5/2018 | Sweeney | G06K 7/1408 |
| 2003/0037075 A1 * | 2/2003 | Hannigan | G06Q 30/02 715/201 |
| 2004/0181749 A1 | 9/2004 | Chellapilla et al. | |
| 2005/0080649 A1 | 4/2005 | Alvarez et al. | |
| 2006/0157559 A1 | 7/2006 | Levy et al. | |
| 2006/0256388 A1 | 11/2006 | Erol et al. | |
| 2006/0280364 A1 | 12/2006 | Ma et al. | |
| 2007/0005173 A1 | 1/2007 | Kanitz et al. | |
| 2007/0047818 A1 * | 3/2007 | Hull | G06K 9/00442 382/190 |
| 2008/0247363 A1 | 10/2008 | Lee et al. | |
| 2009/0039146 A1 * | 2/2009 | Seo | G06F 17/24 235/375 |
| 2009/0108057 A1 | 4/2009 | Mu et al. | |
| 2009/0307232 A1 | 12/2009 | Hall | |
| 2012/0166309 A1 | 6/2012 | Hwang et al. | |
| 2013/0112746 A1 | 5/2013 | Krell et al. | |
| 2014/0039932 A1 * | 2/2014 | Walton, III | G16H 10/65 705/3 |
| 2014/0136012 A1 | 5/2014 | Tam | |
| 2014/0136223 A1 | 5/2014 | Phillips | |
| 2014/0222948 A1 | 8/2014 | Teresawa | |
| 2014/0289107 A1 | 9/2014 | Moshal | |
| 2015/0081460 A1 * | 3/2015 | Chong | G06Q 20/06 705/17 |
| 2015/0120529 A1 * | 4/2015 | Faaborg | G06Q 10/083 705/39 |
| 2015/0124791 A1 * | 5/2015 | Mazandarany | H04W 76/11 370/338 |
| 2016/0100111 A1 | 4/2016 | Atkinson | |

FOREIGN PATENT DOCUMENTS

| | | |
|---|---|---|
| WO | WO 2010/031110 | 3/2010 |
| WO | WO 2011/147433 | 12/2011 |

OTHER PUBLICATIONS

Canadian Patent Office, Office Action, Application No. 2,924,503 dated Dec. 28, 2016.
Canadian Patent Office, Office Action, Application No. 2,924,503 dated Nov. 24, 2017.
European Patent Application No. 14777999.5, Communication pursuant to Article 94(3) EPC dated Jul. 13, 2017.

* cited by examiner

SYSTEMS AND METHODS FOR DECODING AND USING DATA ON CARDS

CROSS-REFERENCE TO RELATED APPLICATIONS

This Application is a continuation of and claims the benefit of U.S. patent application Ser. No. 15/382,319, filed on Dec. 16, 2016, and entitled "Systems and Methods For Decoding And Using Data On Cards," which is a continuation of and claims the benefit of U.S. patent application Ser. No. 14/487,952, filed on Sep. 16, 2014, and entitled "Systems and Methods for Decoding and Using Data on Cards," which claims priority to U.S. Provisional Application No. 61/878,823, filed on Sep. 17, 2013, and entitled "Systems and Methods for Decoding and Using Data on Cards," the entirety of all of which is hereby incorporated by reference herein.

BACKGROUND

Entering personal information by manually typing is error prone and subject to security risk as there is little way to verify that information is accurate. This is further complicated by the lack of a full keyboard on some mobile devices. Further, some regulatory and security requirements mandate that keyed personal information matches how it appears on a government issued ID such as a Driver License. If the information does not match, the transaction can be rejected. This process can be frustrating and time consuming. Some website operators have reported as much as 50% of all web transactions that require personal information are abandoned. This has a negative effect not only on the consumer but also the website operator in the form of reduced web traffic and reduced transactions.

Identification cards, such as government issued identification cards, increasingly include some form of machine-readable data. Often many different entities (e.g., corporations, states, or government organizations) use different encoding for this machine-readable data. Further, many computing devices, such as mobile computing devices, include cameras and sufficient processing capability to parse this machine-readable data.

Other developers have attempted to scan identification card data using Optical Character Recognition (OCR) of the front face of the identification card. Such methods are much more processor intensive and slower than embodiments described herein. Further, such methods are far less accurate, as properly detecting text characters is inherently less accurate for a machine than detecting data encoded in a multi-dimensional bar code (e.g., a code using PDF-417) because scanning a bar code is "machine to machine." Some entities (e.g., government bodies or corporations) will only accept scanned information if that information is machine-to-machine. Such entities will not accept data determined using OCR as this is not machine-to-machine data.

SUMMARY OF EXAMPLE EMBODIMENTS

Embodiments of the present disclosure include devices comprising input devices for scanning passive data-sources, and processing ability to decode machine-readable data stored in the passive data-source. In some embodiments, the scanner may comprise a digital camera. In such an embodiment, the image captured by this digital camera may comprise an image of an identification card. The image may comprise a section of the identification card associated with data encoded in a multidimensional code (e.g., PDF-417). This data may comprise identification data associated with the holder of the identification card. Thus, embodiments of the present disclosure may enable a user with a computing device to capture an image of an identification card and quickly decode data stored thereon.

One illustrative system according to the present disclosure comprises: a network interface; a scanner configured to scan a passive data source on the identification card and transmit a scanner signal associated with the passive data source; a processor coupled to the scanner and the network interface, the processor configured to: receive the scanner signal; process the scanner signal and determine data stored in the passive data source.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Decoding and Using Data on Cards

One illustrative embodiment of the present disclosure comprises a computing system, such as a mobile device, wearable device, smartphone, tablet, portable music device, laptop, desktop, kiosk, or dedicated computer terminal. The illustrative embodiment comprises a digital camera configured to capture images. In the illustrative embodiment, this camera comprises a standard camera found on mobile devices, without any specialized hardware. The illustrative embodiment further comprises a network connection, such as a wired or wireless internet connection.

In the illustrative computing system, the user may access a mobile application, e.g., a shopping application. Once the user has made selections, the user may navigate to a billing and shipping information section of the mobile application. Once here, the user may manually type in his or her name and address as well as shipping or billing information.

Alternatively, to save time, the user may access an illustrative embodiment of the present disclosure. In this embodiment, the developer of the mobile application may have incorporated software configured to use the computing device's camera to capture information from identification cards. The software may be further configured to decode information from the identification cards and insert this information into the mobile application. For example, in some embodiments, this data may be inserted into various locations in the mobile application, e.g., customer log-in, shipping address, billing address, age verification, identify verification, residence verification, or some other purpose in the mobile application.

In the illustrative embodiment, the mobile application may include a user interface widget for accessing the above referenced functionality. For example, in the illustrative embodiment, this widget may appear as a button, switch, graphical user interface, or other user interface available for use with the mobile application. After the user accesses this functionality, e.g., by interacting with the widget, the mobile device may be configured to enter an image capture mode.

Figure 3A:
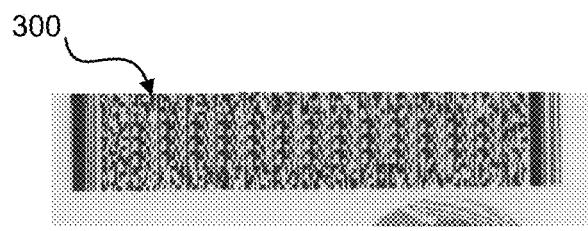
FIG. 3A illustrates an example embodiment of data encoded on an identification card.
Figure 3B:
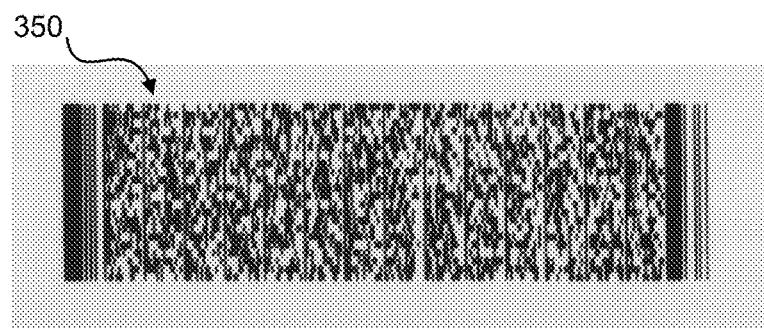
FIG. 3B illustrates another example embodiment of data encoded on an identification card.

In the image-capture mode, the mobile device may access a digital camera coupled to the mobile device and display the output on a display of the mobile device. The user may then direct the camera toward the user's identification card (such as a driver's license). Specifically, the user may direct the camera toward machine-readable data on the identification card. In some embodiments, this data may be encoded in a PDF-417 label appearing on the back of the identification card. PDF is a common type of drivers license encoding. PDF-417 is a stacked linear barcode format. PDF stands for Portable Data File. The 417 signifies that each pattern in the code consists of 4 bars and spaces, and that each pattern is 17 units long, examples of PDF-417 are shown in FIGS. 3A and 3B below. When the camera captures an image of the machine-readable data at sufficient resolution to extract the data encoded therein, the application may exit the image capture screen, and return to another screen of the mobile application.

Once the image has been captured, a processor on the mobile device may process the image to extract encoded data. In some embodiments, this processing may comprise cropping and compressing the data contained on the image. The mobile device may then use a network interface (e.g., a wired or wireless network interface) to transmit the image data to a server.

In some embodiments, the server may comprise algorithms developed to quickly process and determine information associated with the cards. In some embodiments, these algorithms may have been developed utilizing a database of data associated with identification cards. Currently, in the United States, there are more than 1,000 different formats of encoded data associated with identification cards issued by various entities (e.g., corporations, states, government organizations, military, or post office). For example, some states change the encoding used on their drivers licenses every few years. However, those states may leave the older drivers licenses in rotation. Thus, these identification cards may comprise out of date encoding. Further, some states may use multiple different types of encryption. Similarly, multiple states use different encoding and encryption, thus, an algorithm associated with, e.g., Georgia may not be useful for decoding data associated with another state's identification cards. In some embodiments, the remote database may comprise data associated with a large number of these entities. Algorithms developed based on the data in this database may enable the server to quickly process and parse the data on an identification card. Further, in some other embodiments, data comparison software or string searches may enable the database to be quickly searched to determine information about the received data.

Once the data is decoded, the server may use a network connection to transmit the decoded data back to the mobile device. Once the mobile device receives this data, it may insert the data into the billing and shipping information of the mobile application.

In the illustrative embodiment, the time from capturing an image of the encoded data to receipt of the decoded data may be 2 seconds or less. Further, in some embodiments, a faster network connection may enable faster decoding. In other embodiments, the algorithms or some portion of the algorithms may be stored locally on the mobile device. In some embodiments, this may enable the mobile device to capture, process, and decode data nearly instantaneously, e.g., in less than ½ of a second.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

Illustrative Systems for Decoding and Using Data on Cards

Figure 1:
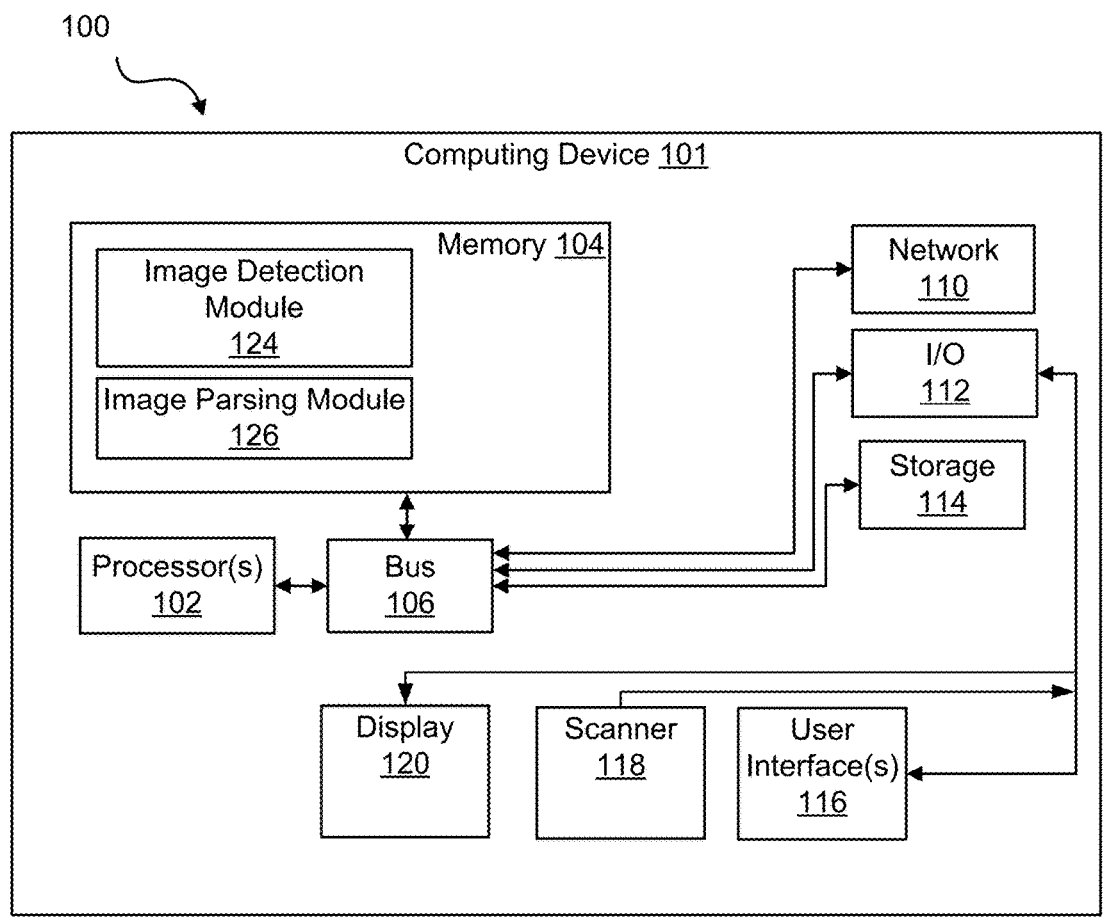
FIG. 1 shows an illustrative system for decoding and using data on cards.

FIG. 1 shows an illustrative system 100 for decoding and using data on cards. Particularly, in this example, system 100 comprises a computing device 101 having one or more processor(s) 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more user interfaces 116 (e.g., keyboards, mice, speakers, microphones, and/or other hardware used to input data or output data) and display 120 (e.g., a display such as a plasma, liquid crystal display (LCD), electronic paper, cathode ray tube (CRT), light emitting diode (LED), or some other type of display known in the art). In some embodiments, user interfaces 116 and display

120 may comprise a single component, e.g., a touch screen display. In some embodiments, I/O components 112 may include speakers configured to play audio signals provided by processor 102.

Storage 114 represents nonvolatile storage such as magnetic, optical, or other storage media included in device 101.

Scanner 118 comprises a sensor configured to detect a passive data-source, such as data encoded in a multidimensional code. For example, in one embodiment, scanner 118 may comprise an optical sensor such as a digital camera. In such an embodiment, processor 102 may use scanner 118 to take an image of a passive data-source, e.g., a matrix barcode such as a QR code, bar code, or multidimensional bar code encoded in PDF-417. In some embodiments, the digital camera may comprise no specialized hardware capability, for example, in some embodiments, the digital camera may be a standard digital camera found on mobile devices such as smartphones and tablets. Further, in some embodiments, the digital camera may comprise an auto-focus capability that enables the camera to capture an image of the multidimensional code at sufficient resolution to reliably extract the encoded data. In such an embodiment, processor 102 may use software stored in memory 104 (discussed below) to determine data encoded in the multidimensional bar code. In other embodiments, scanner 118 may comprise another component, such as a laser scanner, CCD, reader, video camera reader, or other type of scanner configured to scan a passive data-source such as a multidimensional bar code. In still other embodiments, scanner 118 may comprise a scanner configured to detect data from a magnetic code (e.g., a magnetic strip), an RFID, NFC, a SmartCard, an Integrated Circuit Card (ICC) or some other type of passive data.

Turning to memory 104, exemplary program components 124 and 126 are depicted to illustrate how a device may be configured to decode data on identification cards. In this example, an image detection module 124 configures processor 102 to monitor the input from scanner 118 to detect an image comprising machine-readable data. For example, module 124 may configure processor 102 to enter an image capture mode in which display 120 shows the output from scanner 118. Further, in some embodiments, image detection module 124 may be configured to determine the quality of data received from scanner 118. For example, in one embodiment, this may comprise measuring the resolution and focus of the received image. In some embodiments, image detection module 124 may further comprise software to enable processor 102 to determine that the image is of sufficient quality, and therefore capture the image.

Image-parsing module 126 represents a program component that analyzes image data received from scanner 118. In one embodiment, image-parsing module 126 may comprise software configured to enable processor 102 to crop and/or compress the captured image for transmission via network 110 to a remote server (not shown in FIG. 1). In further embodiments, image-parsing module 126 may comprise program components configured to enable processor 102 to perform an image comparison between the captured image and data stored on a local database (not shown in FIG. 1). In some other embodiments, image-parsing module 126 may comprise algorithms that enable the processor 102 to quickly determine the data encoded in a label, e.g., the name, date of birth, address, driver's license number, height, weight, state, county, race, organ donor status, issue date, expiration date, driver restriction, class of vehicle, passport information, criminal record information, or any other information stored in the encoded data. In some embodiments, some of this information may be withheld, e.g., due to privacy concerns. Thus, in some embodiments, information such as a person's height, weight, race, organ donor status, driver restrictions, or class of vehicle may be withheld.

In other embodiments, program components 124 and 126 may be comprise software components configured to enable processor 102 to process other types of passive data-sources, e.g., magnetic strips, RFIDs, NFC, SmartCards, or Integrated Circuit Cards (ICC).

In other embodiments, device 100 may comprise additional components, such as motion detectors, accelerometers, or GPS receivers that processor 102 may use to determine other information, such as the movements or orientation of device 100.

Figure 2:
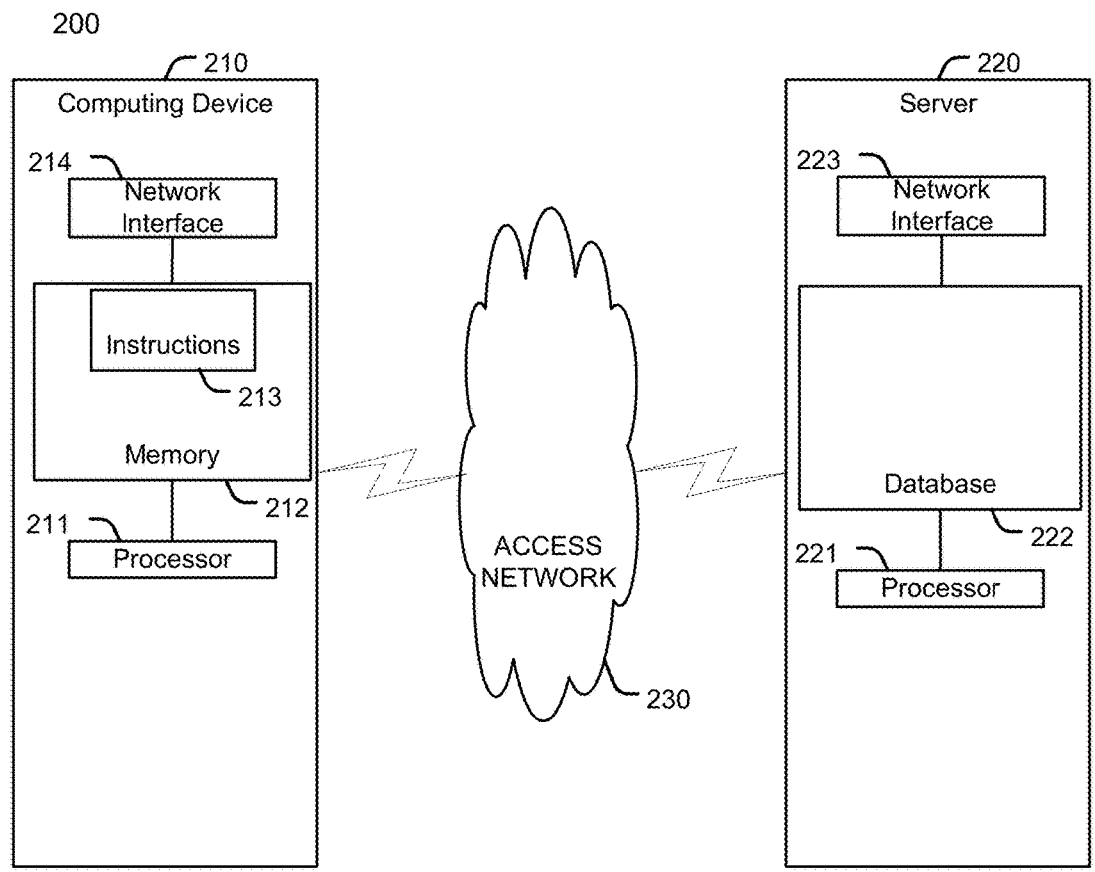
FIG. 2 illustrates another illustrative system for decoding and using data on cards.

FIG. 2 illustrates another illustrative system for decoding and using data on cards 200. As shown in FIG. 2, system 200 comprises a computing device 210, comprising a processor 211, memory 212 comprising instructions 213, and a network interface 214. In some embodiments, computing device 210, and its components may operate similarly to the components of computing device 101 described above with regard to FIG. 1. Thus, in some embodiments, the components of computing device 210 may enable the computing device to scan a passive data-source, process the data, and transmit the processed data via access network 230.

In some embodiments the access network 230 may be a 3GPP network, a 3GPP2 network, a WiMAX network, 4G LTE, HSPA+, UMTS, a Wi-Fi network (e.g., a network that operates in accordance with an IEEE 802.11 standard), or some other wireless access network. In other embodiments, access network 230 may comprise a wired network such as Ethernet, USB, IEEE 1394, cable, or telephone networks. In some embodiments, access network 230 may comprise a plurality of different types of wired and/or wireless networks configured to transmit data between computing device 210 and server 220.

As shown in FIG. 2, the access network 230 is further coupled to a server 220. Server 220 is configured to receive data sent from computing device 210 via access network 230 using network interface 223. Network interface 223 may comprise a wired and/or wireless network interface configured to receive data using access network 230.

Server 220 further comprises a processor 221 coupled to a database 222. Database 222 may comprise a database of data associated with identification cards. In some embodiments, the database 222 may comprise data associated with identification cards issued by one or more of corporations, states, and government organizations. Processor 221 may be configured to use data comparison software to compare data received from computing device 210 to data stored in database 222 to determine the type of encoding associated with an image and then quickly decode the data, e.g., by parsing the data to determine the stored information, e.g., the name, date of birth, address, driver's license number, height, weight, state, county, or any other information stored in the encoded data.

In other embodiments, rather than performing a full lookup of database 222, processor 221 may instead comprise algorithms configured to determine information about a passive data source without having to search database 222. In some embodiments, these algorithms may have been developed using the data available in database 222. Further, in some embodiments, these algorithms may enable the processor 221 to quickly determine the jurisdiction that issued a card, e.g., by determining the Issuer Identification Number ("TIN Number") associated with the card, or the type of encryption used in the card. Once this is determined, processor 221 may access an algorithm associated with that IIN number to quickly determine data associated with the passive data source. In some embodiments, processor 221 may be configured to determine the stored data in 2 seconds or less.

Further, in some embodiments, processor 221 and database 222 may be configured to adapt to new data types. For example, in some embodiments, the administrators of database 222 may periodically update database 222 with new data associated with new entities (e.g., states, government organizations, or corporations). In other embodiments, processor 221, may be configured to update database 222 based on new data received from entities as the entities post new information (e.g., as a state releases a new type of identification card).

In other embodiments, processor 221 and database 222 may be configured to analyze received data that is not associated with a known type, and based on patterns of other received data, make a determination about the received data. For example, in one embodiment, processor 221 and database 222 may be configured to compare the encoding to known encoding types and thus determine that the encoded data is associated with North Carolina. The processor 221 and database 222 may be configured to further determine that some component of the encoding or encryption is incorrect, for example, because the person who set up the multidimensional code for the drivers licenses in a jurisdiction (e.g., a state or county) used the wrong type of encoding. Based on this determination processor 221 may update database 222 with new information about this jurisdiction (e.g., the state or county), to thus enable processor 221 to use database 222 to determine data associated with that jurisdiction in the future.

In other embodiments, not shown in FIG. 2, computing device 210 and server 220 may comprise additional components, such as additional memory and processing components or network components configured to provide faster or more convenient access via access network 230.

Turning now to FIGS. 3A and 3B, FIGS. 3A and 3B comprise images 300 and 350 of data encoded on the back of drivers licenses from two different states. As shown in FIGS. 3A and 3B, the data is encoded using PDF-417. As discussed above, PDF-417 is a stacked linear barcode format. PDF stands for Portable Data File. The 417 signifies that each pattern in the code consists of 4 bars and spaces, and that each pattern is 17 units long.

In some embodiments, data encoded using PDF-417 may further comprise some type of compression or encryption. These types of encryption and compression are applied irregularly amongst jurisdictions such as Federal and State organizations. The present disclosure comprises a database that takes into account these differences and is usable for all jurisdictions (e.g., using a prior technology a Georgia government body may be able to scan identification cards issued by Georgia but cannot effectively scan cards issued by other states). Further, in some embodiments, additional data may be encoded into the identification card. For example, in Florida some information associated with the driver may be embedded into the driver's license number. Thus, in some embodiments, a database associated with Florida driver's licenses may be useful only if it is designed to store this information.

Figure 3C:
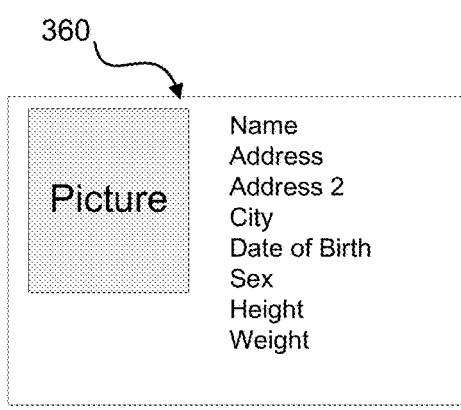
FIG. 3C illustrates an example embodiment of the front face of an identification card.
Figure 3D:
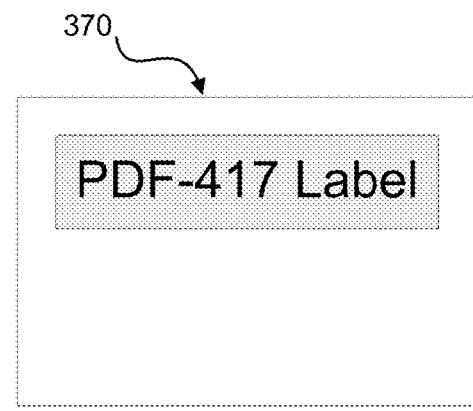
FIG. 3D illustrates an example location of a PDF-417 label on an identification card.

Turning to FIG. 3C, FIG. 3C illustrates an example embodiment of the front face of an identification card 360. As shown in FIG. 3C, the identification card is an example similar to many states' driver's licenses and includes a picture as well as written information identifying the holder of the driver's license. FIG. 3D shows the reverse side 370 of the identification card 360. As shown in FIG. 3D, the identification card includes a PDF-417 label (e.g., labels 300 or 350 described above). In some embodiments, this label may comprise all or some part of the data on the front of the identification card. Further, in some embodiments, rather than being on the back of the card, the label may instead be located on the front. For example, some military identification cards (e.g., CAC cards) include a label on the front of the card. Some of these cards further include additional passive data-sources, such as ICC, SmartCards, RFIDs, NFCs, magnetic strips, or QR Codes. In some embodiments, rather than a PDF-417 label, the drivers license may instead comprise one of these other types of passive data-sources. Embodiments of the present disclosure may use similar technology to capture and decode data stored in these additional types of passive data sources.

Illustrative Methods for Decoding and Using Data on Cards

Figure 4:
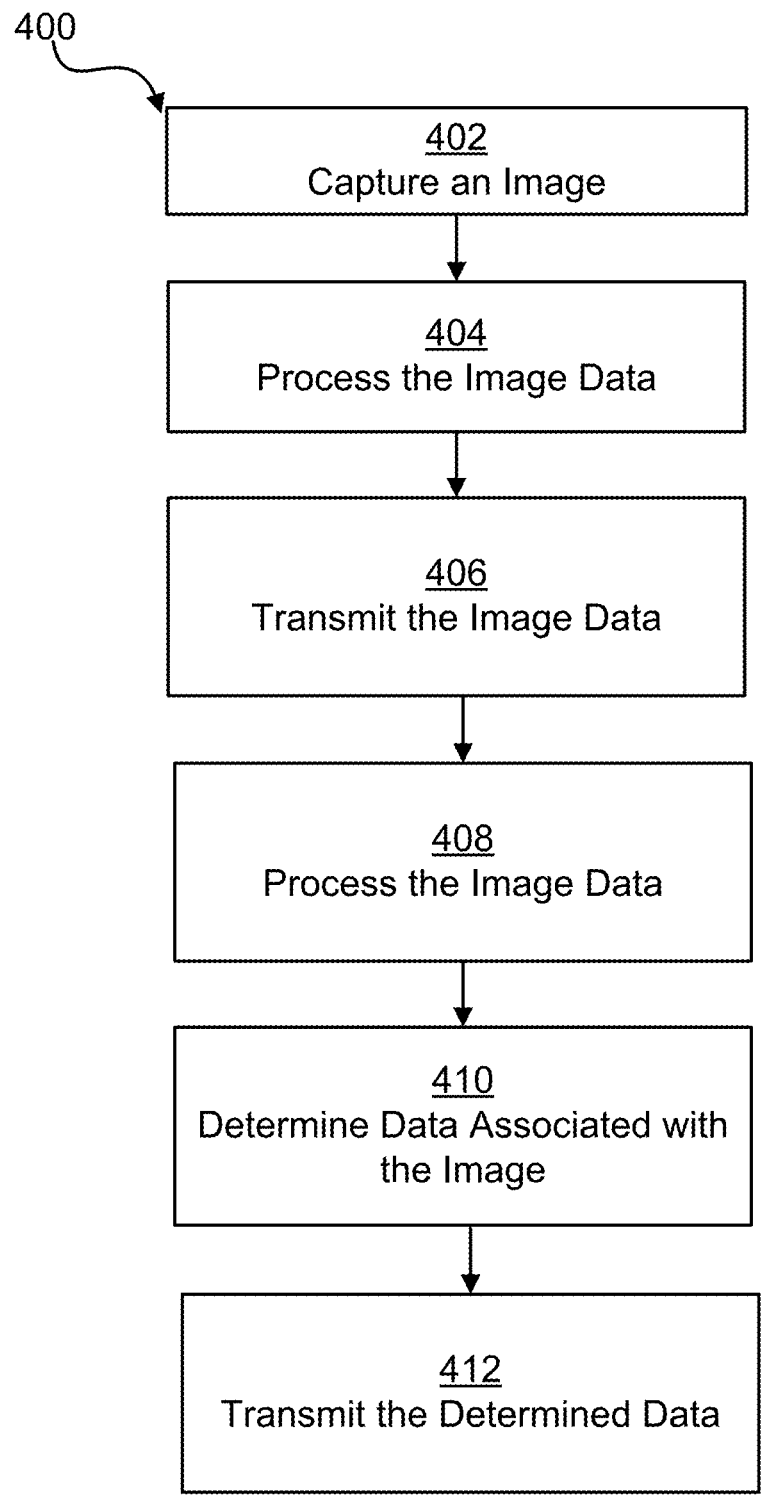
FIG. 4 illustrates a flow chart for a method for decoding and using data on cards.

FIG. 4 is a flowchart showing an illustrative method 400 for decoding and using data on cards. In some embodiments, the steps in flow chart 400 may be implemented in program code executed by a processor, for example, the processor in a general purpose computer, mobile device, or server. In some embodiments, these steps may be implemented by a group of processors. In some embodiments the steps shown in FIG. 4 may be performed in a different order. Alternatively, in some embodiments, one or more of the steps shown in FIG. 4 may be skipped or additional steps not shown in FIG. 4 may be performed. The steps below are described with reference to components described above with regard to system 100 shown in FIG. 1.

The method 400 is described with regard to image capture of a passive data source (e.g., of an image of a multidimensional bar code). However, the steps below are equally applicable to processing data extracted from other types of passive data sources. For example, these method steps may be applied to capturing data from a magnetic code (e.g., a magnetic strip), an RFID, NFC, a SmartCard, an Integrated Circuit Card (ICC) or some other type of passive data.

The method 400 begins at step 402 when processor 102 captures an image with scanner 118. As discussed above, scanner 118 may comprise one of a plurality of devices configured to capture an image, for example, a digital camera or video camera. The image may comprise an image of machine-readable data encoded in an identification card (e.g., on the back of the identification card). In some embodiments, the machine-readable data may comprise a multidimensional encoding, such as data encoded using PDF-417.

Next processor 102 processes the image data 404. In some embodiments, processing the image data may comprise cropping and/or compressing the image data. In other embodiments, processing the image data may comprise extracting known elements from the image. For example, in some embodiments, the image may comprise non-encrypted PDF-417. In such an embodiment, processor 102 may extract available known data from the image. For example, in some embodiments, the processor 102 may resize the image to 640×480 pixels, transform the image to 24-bit grayscale with a quality of 80%, an convert the image to Base64 string representation.

Then at step 406 processor 102 transmits the image data. In some embodiments, processor 102 may compress the image data prior to transmission. In some embodiments, the processor 102 may transmit the data to a server, which may comprise a database. Processor 102 may use network 110 to transmit the data. As discussed above, network 110 may comprise any type of wired and/or wireless network available to computing device 101. In some embodiments, rather than transmitting the data, processor 102 may instead perform steps 408-412.

Then at step 408, the image data is processed. In some embodiments, a server, such as server 220 described above with regard to FIG. 2, may process the data. In some embodiments, processing the image may comprise determining information about the image such as the image's encoding type or encryption type. In some embodiments, processing the data may comprise comparing the data to a database. In other embodiments, rather than performing a line-by-line comparison to a database, the server may instead use a series of algorithms developed based on previous cards to determine the data. For example, the server may comprise a database 222 of data associated with identification cards. The server may further comprise a series of algorithms configured to determine information about identification cards.

In some embodiments, these algorithms may have been developed using the data stored in database 222. In some embodiments, these algorithms may enable the server to quickly determine identification data. For example, the server may use algorithms and logic to quickly determine the IIN Number associated with the card. Further, once the IIN number is identified, the server may use low overhead string functions to perform a lookup in a specially formatted string that contains all of the applicable values. In some embodiments, this may comprise using a Supertanker String Lookup technique during the data discovery process. These may comprise low overhead string functions to perform a lookup in a specially formatted string that contains all of the applicable values. For example, enclosing the ID Issue State/Province in dashes "-" and looking for the index of its position in the following string: "-BC-, -MB-, -NF-, -PO-, -SK-, -ON-, -NS-, -NB-, -PE-". In some embodiments, if the index is greater than zero, then the country of origin is Canada. Another example, putting a dash in front of the IIN and looking for the index of its position in a string like the following would return the corresponding state if valid: "-636033AL, -636059AK, -636026AZ, -636021AR". In both of the above examples, the resources required to find the position of a string within another are much lower than doing a lookup in a table or other data structure.

Further, in some embodiments, processing the image data comprises determining that there is enough captured data to start the process. In some embodiments, processing may also determine whether the data was extracted from a magnetic stripe (e.g., via swiping a reader rather than a captured image) or a barcode. In some embodiments, processing the data may further comprise replacing any invalid binary characters and standardizing on the Track Sentinels. In some embodiments, processing the data may further comprise checking binary data points to determine if any information is encrypted (e.g., if the data comprises an encrypted drivers license or identification card). In some embodiments, the processing may further comprise replacing any invalid binary characters and determining the type of data (e.g., drivers license, military identification, passport, or some other data type).

Next, data associated with the image is determined 410. In some embodiments, determining the data associated with the image may comprise parsing the data to determine the stored information, e.g., the name, date of birth, address, driver's license number, height, weight, state, county, issue date, expiration date, or any other information stored in the encoded data. In some embodiments, this parsing process may comprise identifying and consolidating the field separators and delimiters in the multidimensional code, and identifying the name parts, taking into account the variations based on state/province, and intelligently recognizing which parts of the name are provided Then the data is transmitted 412. In some embodiments, the server may transmit the data using a network interface and an access network (e.g., network interface 223 and access network 230 described above with regard to FIG. 2). In other embodiments, the processing may be performed locally, thus, the data may already be local to the processor 102.

Once the data is received by the computing device 101, it may be used for a plurality of purposes. For example, in some embodiments, the data may be used to fill out a form, for example, a form stored locally on computing device 101 or a form accessed via the internet (e.g., a web page or a form associated with a mobile application). This may enable the user to quickly enter information associated with the identification data. In some embodiments, this data may be used for age or identity verification, e.g., by a shipping company, website, bar, or a law enforcement agency. Alternatively, in some embodiments, this data may be used to fill in billing or shipping information for an application, e.g., an e-commerce application.

In some embodiments, e-commerce companies such as web pages or application developers may include systems and methods for determining data associated with identification cards into their web pages or applications. This may be provided to users as a feature that enables the user to quickly enter information into, e.g., forms or questionnaires.

In some embodiments, the systems and methods described above may be provided to application developers on a software development kit (SDK) that enables the developer (e.g., the developer of the webpage or iOS, Android, or Windows application) to quickly plug the functionality into their application or web page as a module. In other embodiments, an application or web page development company may develop its own image capture software, but may be given access to image processing capability using the database and algorithms described herein. In other embodiments, the database of data associated with identification card data may be sold to application or web page development companies. In other embodiments, only portions of the database may be sold or made available, e.g., only the segment of the database associated with a state, region, or government entity. In other embodiments, algorithms developed to determine identification data associated only a certain region may be made available.

Illustrative Example of Systems and Methods for Decoding and Using Data on Cards As described in further detail above, one embodiment of the present disclosure comprises a smartphone with a digital camera. The user may access a mobile application or web page that requests the user provide his or her address, date of birth, or some other identifying information. Rather than entering this information manually, the user instead captures an image of a PDF-417 label on the back of the user's driver's license. Depending on the state that issued the driver's license, the label will include identification data associated with the user (e.g., name, address, date of birth, height, weight, issue date, expiration date, etc.). After capturing the image, the smartphone will crop and compress the image, and then send that image to a server. The server comprises processing capability to quickly analyze the image and determine the encoded identification data, and then transmit that data back to the mobile device. In some embodiments, the server may use string searches to be able to return a result within two seconds or less. The mobile device may then use this data to fill in information in the mobile application or a web-page.

In alternate embodiments, similar operations may be performed using a web application running on, e.g., a laptop or desktop computer or tablet. Further, in alternate embodiments, similar operations may be performed by a kiosk, e.g., a kiosk at an airport (e.g., for airline check-in), or a kiosk at a retail location (e.g., for loyalty card enrollment), or some other dedicated workstation. This information may be used for a plurality of purposes, e.g., customer log-in, shipping address, billing address, age verification, identify verification, residence verification, or some other purpose for which identification/address/personal information may be useful.

Advantages of Embodiments of Systems and Methods for Decoding and Using Data on Cards There are numerous advantages of systems and methods for decoding and using data on cards. For example, embodiments may be able to completely eliminate key entry of the data into applications or interfaces such as websites or kiosks. In such embodiments, the consumer simply takes a picture of the ID Card barcode and the disclosed systems and methods extract the needed data and may insert it into the proper location. In some embodiments, this may reduce the required number of steps from twenty or more to just one. Further, embodiments may be implemented using no specialized hardware and instead may rely only on the smartphone camera, which is already available.

Further, embodiments may drastically reduce the complexity of the login process or the process to enter user data. This may allow web app developers to streamline and optimize the process flow, meaning fewer steps, less time, and a better consumer experience. Thus, some embodiments may reduce the number of abandoned web transactions and increase web site traffic. Further, by reducing or removing the human element of manual key entry, the collected information may be more accurate and match the encoded data of an identification card (e.g., a drivers license). Further, because embodiments of the present disclosure may verify that the source of the data is a physical card, such as a government issued driver license, the risk of fraud and identity theft may be reduced. Further, embodiments may verify the source of each data element in the encoded data ensuring that that web or mobile application processes such as Homeland Security Checks, Credit Applications, Identity and Age Verification, or Background Checks etc. are using verified data from a verified source.

Embodiments of the present disclosure may be useful for travel functions such as purchasing or checking in with airlines, hotels, or car rentals, etc. In applications, such as these, that often require personal information to verify identity or age, or to run a background check (e.g., a homeland security check or credit check), the personal information often must match a government issued ID, such as a driver's license. Embodiments of the present disclosure can ensure that this information is accurate and verifiable. This enhanced accuracy is useful both for security and payment purpose. Further, entering data using the systems and methods disclosed herein requires less effort on the part of the user than manual entry.

Further, embodiments of the present disclosure may be useful for financial services applications, such as credit cards. In these types of applications personal information is required for verification, e.g., of identity and age or credit checks. Again, the information needs to match a government issued ID, such as a driver's license. Again, the methods disclosed herein both enable for more efficient entry, as well as enhanced accuracy and verification.

Additional embodiments may be useful for website registration or website access control. This may be useful, for example, for age restricted products. For example, some websites, may require age verifications prior to access, e.g., applications related to tobacco, cannabis, pharmaceuticals, alcohol, firearms, gambling, etc. In each of these applications, personal information has to be provided for identity and age verification. Again, the information needs to match a government issued ID, such as a driver's license. Again, the methods disclosed herein both enable for more efficient entry, as well as enhanced accuracy and verification.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system for decoding data stored on an identification card comprising:
    a scanner configured to scan a passive data source on the identification card and transmit a scanner signal associated with the passive data source; and
    a processor coupled to the scanner, the processor configured to:
        receive the scanner signal;
        determine a type of encryption associated with the passive data source;
        extract one or more known data elements from the passive data source;
        create a data file associated with the scanner signal;
        transmit the data file and the type of encryption to a server, the server configured to:
            extract data comprising one or more of: a first name, a last name, an address, a city, a state, a zip code, an issue date, an expiration date, or a birthdate from the data file; and
            transmit the extracted data to a device associated with the scanner; and
        receive the extracted data from the server.

2. The system of claim 1, wherein the processor is further configured to log-in to a website based on the one or more known data elements and the extracted data.

3. The system of claim 1, wherein the processor is further configured to display the one or more known data elements and the extracted data in a user readable form.

4. The system of claim 3, wherein the user readable form comprises a form associated with one or more of: a web page, a mobile application, a web application, a government organization, or an e-commerce company.

5. The system of claim 1, wherein the processor is further configured to:
    compress the data file associated with the scanner signal; and
    transmit the compressed data file to a server using a network interface.

6. The system of claim 1, wherein the passive data source comprises one or more of: data encoded in a Near Field Communication (NFC) device, a Radio-frequency identification (RFID) chip, a SmartCard, an Integrated Circuit Card (ICC), a magnetic strip, a quick response (QR) code, optical media, or PDF-417.

7. The system of claim 1, wherein the device comprises: a mobile device, a kiosk, a laptop computer, a tablet, a wearable device, or a desktop computer.

8. The system of claim 1, wherein the scanner comprises a digital camera on a smartphone and wherein the processor is configured to crop an image of the passive data source.

9. The system of claim 1, wherein the processor is configured to display the known data elements and the extracted data in a user readable form within two seconds or less from the time the processor receives the scanner signal.

10. A method for decoding data stored on an identification card comprising:
    receiving a scanner signal from a scanner, the scanner signal comprising data associated with a passive data source;
    determining a type of encryption associated with the passive data source;
    extracting one or more known data elements from the passive data source;

creating a data file associated with the scanner signal;
transmitting the data file and the type of encryption to a server, the server configured to:
extract data comprising one or more of: a first name, a last name, an address, a city, a state, a zip code, an issue date, an expiration date, or a birthdate from the data file; and
transmit the extracted data to a device associated with the scanner; and
receiving the extracted data from the server.

11. The method of claim 10, further comprising logging into to a website based on the one or more known data elements and the extracted data.

12. The method of claim 10, further comprising displaying the one or more known data elements and the extracted data in a user readable form.

13. The method of claim 12, wherein the form comprises a form associated with one or more of: a web page, a mobile application, a web application, a government organization, or an e-commerce company.

14. The method of claim 10, further comprising:
compressing the data file associated with the scanner signal; and
transmitting the compressed data file to a server using a network interface.

15. The method of claim 10, wherein the server comprises a server configured to store data associated with multiple different types of identification cards.

16. The method of claim 10, wherein the passive data source comprises data encoded in one or more of: a Near Field Communication (NFC) device, a Radio-frequency identification (RFID) chip, a SmartCard, an Integrated Circuit Card (ICC), a magnetic strip, a quick response (QR) code, optical media, or PDF-417.

17. The method of claim 10, wherein the scanner comprises: a digital camera on a smartphone and the method further comprises cropping an image of the passive data source.

18. A non-transitory computer readable medium having stored thereon computer implementable instructions that if implemented by one or more processing units operatively enable the one or more processing units to:
receive a scanner signal from a scanner, the scanner signal comprising data associated with a passive data source;
determine a type of encryption associated with the passive data source;
extract one or more known data elements from the passive data source;
create a data file associated with the scanner signal;
transmit the data file and the type of encryption to a server, the server configured to:
extract data comprising one or more of: a first name, a last name, an address, a city, a state, a zip code, an issue date, an expiration date, or a birthdate from the data file; and
transmit the extracted data to a device associated with the scanner; and
receive the extracted data from the server.

19. The computer readable medium of claim 18, further comprising computer implementable instructions that if implemented by one or more processing units operatively enable the one or more processing units to:
compress the data file associated with the scanner signal; and
transmit the compressed data file to a server using a network interface.

20. The computer readable medium of claim 18, further comprising computer implementable instructions that if implemented by one or more processing units operatively enable the one or more processing units to log into to a website based on the one or more known data elements and the extracted data.

* * * * *